United States Patent
Kunito et al.

(10) Patent No.: US 7,818,784 B2
(45) Date of Patent: Oct. 19, 2010

(54) COMMUNICATION CONTROL APPARATUS AND COMMUNICATION CONTROL SYSTEM

(75) Inventors: Yoshiyuki Kunito, Kanagawa (JP); Yasuto Masuda, Kanagawa (JP); Masayuki Imanishi, Kanagawa (JP); Koichi Ogasawara, Kanagawa (JP); Minoru Furukawa, Chiba (JP)

(73) Assignee: Sony Corporation, Tokyo (JP)

( * ) Notice: Subject to any disclaimer, the term of this patent is extended or adjusted under 35 U.S.C. 154(b) by 1098 days.

(21) Appl. No.: 11/506,028

(22) Filed: Aug. 17, 2006

(65) Prior Publication Data

US 2007/0043941 A1 Feb. 22, 2007

(30) Foreign Application Priority Data

Aug. 19, 2005 (JP) ............................. 2005-238143

(51) Int. Cl.
- *G06F 7/04* (2006.01)
- *H04L 9/32* (2006.01)
- *G06F 21/00* (2006.01)

(52) U.S. Cl. ........................... 726/2; 713/168; 713/184
(58) Field of Classification Search ................ 713/184, 713/168; 726/2
See application file for complete search history.

(56) References Cited

U.S. PATENT DOCUMENTS

| | | | | |
|---|---|---|---|---|
| 5,493,692 A * | 2/1996 | Theimer et al. | ............. | 455/26.1 |
| 5,864,673 A * | 1/1999 | Ohto et al. | .................. | 709/219 |
| 5,948,041 A * | 9/1999 | Abo et al. | .................... | 701/207 |
| 6,151,493 A | 11/2000 | Sasakura et al. | | |
| 6,466,232 B1 * | 10/2002 | Newell et al. | ............... | 715/700 |
| 6,590,969 B1 * | 7/2003 | Peters et al. | ............ | 379/211.02 |
| 6,813,501 B2 * | 11/2004 | Kinnunen et al. | ......... | 455/456.2 |
| 7,073,129 B1 * | 7/2006 | Robarts et al. | ............... | 715/740 |
| 7,103,806 B1 * | 9/2006 | Horvitz | ........................ | 714/43 |
| 7,194,763 B2 * | 3/2007 | Potter et al. | ..................... | 726/7 |
| 2004/0068472 A1 * | 4/2004 | Sahota et al. | .................. | 705/64 |
| 2006/0026671 A1 * | 2/2006 | Potter et al. | ..................... | 726/7 |

FOREIGN PATENT DOCUMENTS

| | | | |
|---|---|---|---|
| EP | 770968 A2 * | 5/1997 | |
| JP | 2931276 | 5/1999 | |
| JP | 2005-117631 | 4/2005 | |
| JP | 2005 130287 | 5/2005 | |
| JP | 2005-311426 | 11/2005 | |
| WO | WO 2004/002176 | 12/2003 | |

* cited by examiner

*Primary Examiner*—Michael Pyzocha
(74) *Attorney, Agent, or Firm*—Frommer Lawrence & Haug LLP; William S. Frommer

(57) ABSTRACT

A communication control apparatus selects an optimum terminal for an authentication device among a plurality of terminals that have completed authentication of the authentication device via wireless communication. The communication control apparatus has an information acquiring unit and a selecting unit. The information acquiring unit acquires address information and capability information of each of the plurality of terminals and identification information of the authentication device from each of the plurality of terminals. The selecting unit selects the optimum terminal having a capability of handling data addressed to the authentication device among the plurality of terminals on the basis of the capability information of the plurality of terminals and the identification information of the authentication device acquired by the information acquiring unit, when the address information and capability information of the plurality of terminals are acquired by the information acquiring unit.

18 Claims, 9 Drawing Sheets

COMMUNICATION CONTROL APPARATUS AND COMMUNICATION CONTROL SYSTEM

CROSS REFERENCES TO RELATED APPLICATIONS

The present invention contains subject matter related to Japanese Patent Application JP 2005-238143 filed in the Japanese Patent Office on Aug. 19, 2005, the entire contents of which are incorporated herein by reference.

BACKGROUND OF THE INVENTION

1. Field of the Invention

The present invention relates to a communication control apparatus and a communication control system that select the optimum terminal for a user carrying an authentication device when there are a plurality of terminals that have completed authentication of the authentication device via wireless communication.

2. Description of the Related Art

In a ubiquitous network, it is expected that anyone can exchange information anytime and anywhere. When there are a plurality of available terminals in a location where a user is at, the user has to select one of these terminals. A known system requires a user to select a terminal to use, and to input a user ID and a password with a keyboard so as to login the system. However, this login operation imposes stress on the user, which is far from the ideal ubiquitous network. Desirably, in the ubiquitous network, the user is provided with an optimum terminal, which is selected by the network seamlessly, in a secure manner.

Particularly, in a system employing wireless UIMs (User Identity Modules) for personal authentication, it is desired that an optimum terminal located near a user is automatically made available. In such a case, the user does not have to perform a login operation (e.g., input of a user ID and a password with a keyboard). Such a system generally has a plurality of available terminals in an area where the authentication can be performed using the wireless UIMs. Japanese Unexamined Patent Application Publication No. 2005-130287 has suggested a technique enabling selection of a terminal capable of performing the suitable communication among a plurality of terminals.

SUMMARY OF THE INVENTION

A system that performs authentication between an authentication device carried by a user and a plurality of terminals located near the user (i.e., an authentication device) via wireless communication so as to make the terminals available to the user does not implement a mechanism to select an optimum terminal among the plurality of available terminals. This prevents the user from appropriately determining which terminal to use in order to receive a desired service even if there are several available terminals, which is inconvenient for the user.

In view of the above-described disadvantages, embodiments of the present invention are made. More specifically, according to an embodiment of the present invention, a communication control apparatus, which selects an optimum terminal for an authentication device among a plurality of terminals that have completed authentication of the authentication device via wireless communication, includes information acquiring means and selecting means. The information acquiring means acquires address information and capability information of each of the plurality of terminals and identification information of the authentication device from each of the plurality of terminals. The selecting means selects the optimum terminal having a capability of handling data addressed to the authentication device among the plurality of terminals on the basis of the capability information of the plurality of terminals and the identification information of the authentication device acquired by the information acquiring means, when the address information and capability information of the plurality of terminals are acquired by the information acquiring means.

In the above-described embodiment, the communication control apparatus automatically selects the optimum terminal capable of handling the data addressed to the authentication device, when there are the plurality of terminals that have completed the authentication of the authentication devices via wireless communication. Thus, a user can immediately utilize the terminal capable of handling the data addressed to the user.

In addition, according to another embodiment of the present invention, a communication control apparatus, which selects an optimum terminal for an authentication device among a plurality of terminals that have completed authentication of the authentication device via wireless communication, includes information acquiring means and selecting means. The information acquiring means acquires address information and capability information of each of the plurality of terminals and identification information and processing request information of the authentication device from each of the plurality of terminals. The selecting means selects the optimum terminal having the identification information of the authentication device acquired by the information acquiring means and a capability of satisfying a processing request corresponding to the processing request information when the address information and capability information of the plurality of terminals are acquired by the information acquiring means.

In the above-described embodiment, the communication control apparatus automatically selects the optimum terminal having a capability of satisfying the processing request included in the processing request information transmitted from the authentication device, when there are the plurality of terminals that have completed the authentication of the authentication device via wireless communication. Thus, a user can immediately utilize the terminal capable of executing the data processing desired by the user.

Furthermore, according to still another embodiment of the present invention, a communication control system includes a plurality of terminals and a communication control apparatus. The plurality of terminals perform authentication of an authentication device carried by a user via wireless communication. The communication control apparatus, connected to the plurality of terminals, has information acquiring means and selecting means. The information acquiring means acquires, when there are a plurality of terminals that have completed authentication of the authentication device, address information and capability information of each of the plurality of terminals and identification information of the authentication device from each of the plurality of terminals. The selecting means selects the optimum terminal having a capability of handling data addressed to the authentication device among the plurality of terminals on the basis of the capability information of the plurality of terminals and the identification information of the authentication device acquired by the information acquiring means, when the address information and capability information of the plurality of terminals are acquired by the information acquiring means.

In the above-described embodiment, the communication control apparatus automatically selects the optimum terminal having capable of handling the data addressed to the authentication device, when there are the plurality of terminals that have completed the authentication of the authentication device via wireless communication. Thus, a user can immediately utilize the terminal capable of handling the data addressed to the user.

Moreover, according to a further embodiment of the present invention, a communication control system includes a plurality of terminals and a communication control apparatus. The plurality of terminals perform authentication of an authentication device carried by a user via wireless communication. The communication control apparatus, connected to the plurality of terminals, has information acquiring means and selecting means. The information acquiring means acquires, when there are a plurality of terminals that have completed authentication of the authentication device, address information and capability information of each of the plurality of terminals and identification information and processing request information of the authentication device from each of the plurality of terminals. The selecting means selects the optimum terminal having the identification information of the authentication device acquired by the information acquiring means and a capability of satisfying a processing request corresponding to the processing request information when the address information and capability information of the plurality of terminals are acquired by the information acquiring means.

In the above-described embodiment, the communication control apparatus automatically selects the optimum terminal having a capability of satisfying the processing request included in the processing request information transmitted from the authentication device, when there are the plurality of terminals that have completed the authentication of the authentication device via wireless communication. Thus, a user can immediately utilize the terminal capable of executing the data processing desired by the user.

In the embodiments of the invention, for example, a wireless UIM (User Identity Module) carried by a user can be used as the authentication device. The wireless UIM stores information enabling identification of the user. In addition, types of the terminal include a personal computer (having functions such as a mailing function, a web browsing function, and a file sharing function) capable of providing various services, an IP (Internet Protocol) phone, and a facsimile machine. Furthermore, types of the communication control apparatus include an IP telephony server and a network rooter.

Thus, the embodiments of the present invention eliminate the necessity for changing terminals in accordance with the kinds of service. In addition, the embodiments of the present invention allow the user to rapidly recognize the currently available services and the available terminals among the plurality of terminals. Accordingly, the users are free from being conscious of the terminal available to the user, thus implementing a stress-free ubiquitous network.

DESCRIPTION OF THE PREFERRED EMBODIMENTS

Embodiments of the present invention will be described in detail below with reference to accompanying drawings.

[Server-Driven Communication Control System]

Figure 1:
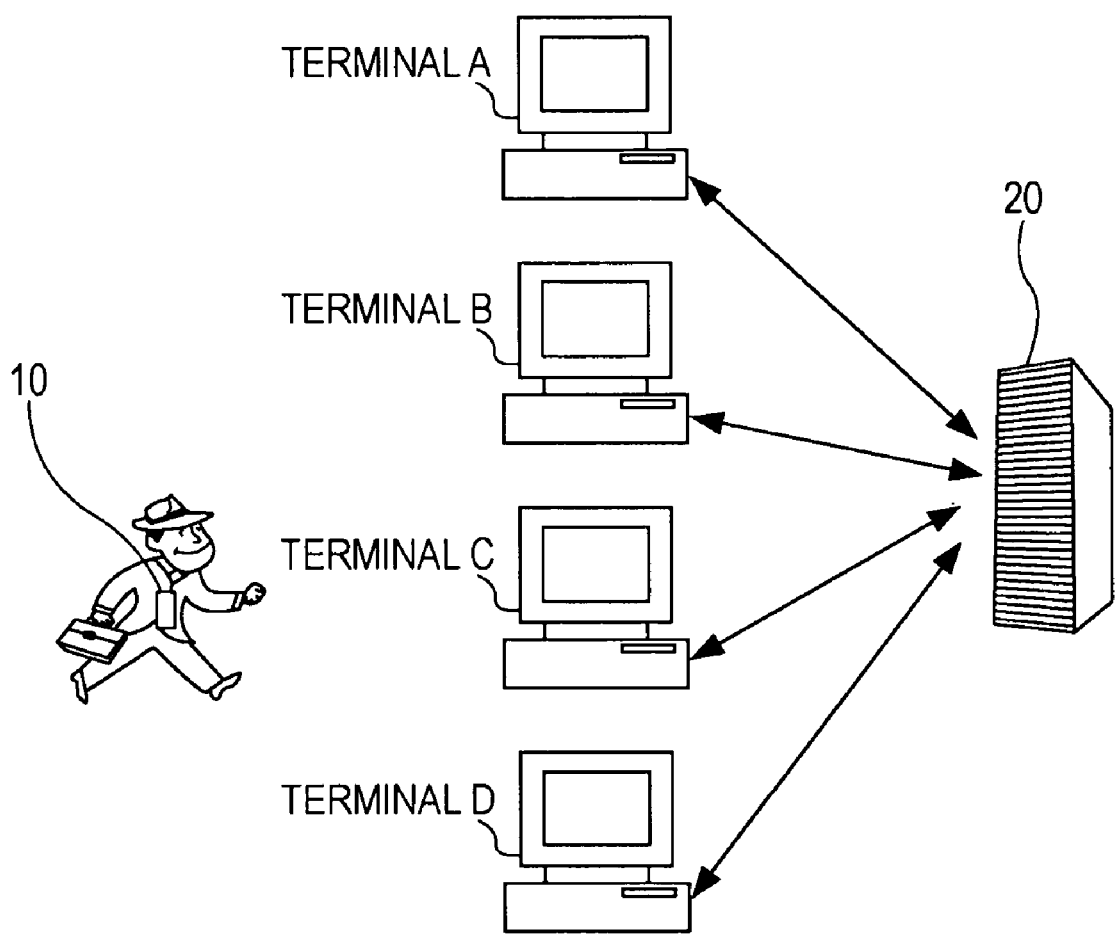
FIG. 1 is a schematic diagram illustrating a configuration of a server-driven communication control system according to an embodiment of the present invention.

FIG. 1 is a schematic diagram illustrating a server-driven communication control system according to an embodiment of the present invention. FIG. 1 illustrates an example case where the communication control system employs a wireless UIM (User Identity Module) 10 and automatically directs an IP (Internet Protocol) phone call to an optimum terminal located near a user. More specifically, the communication control system includes the wireless UIM (i.e., an authentication device) 10, IP telephony terminals (i.e., terminals A to D in the example shown in FIG. 1), and an IP telephony server 20. The wireless UIM 10 is carried by a user of services. The IP telephony terminals provide services to users. The IP telephony server 20 serves as a communication control apparatus.

Hereinafter, an area where each of the terminals A to D can perform authentication of a user is referred to as "authentication area". In the communication control system, if the user carrying the wireless UIM 10 (i.e., the authentication device) enters an authentication area of each of the terminals A to D, authentication is automatically performed wirelessly between the wireless UIM 10 and each terminal. The terminals that have completed the authentication become available to the user. In the embodiment of the present invention, it is assumed that an IP telephony call is sent from another user (not shown) to the user shown in FIG. 1 through the IP telephony server 20. The IP telephony server 20 (i.e., the communication control apparatus), after selecting the optimum IP telephony terminal (e.g., one of the terminals A to D) for the user, directs the call to the selected terminal.

Figure 2:
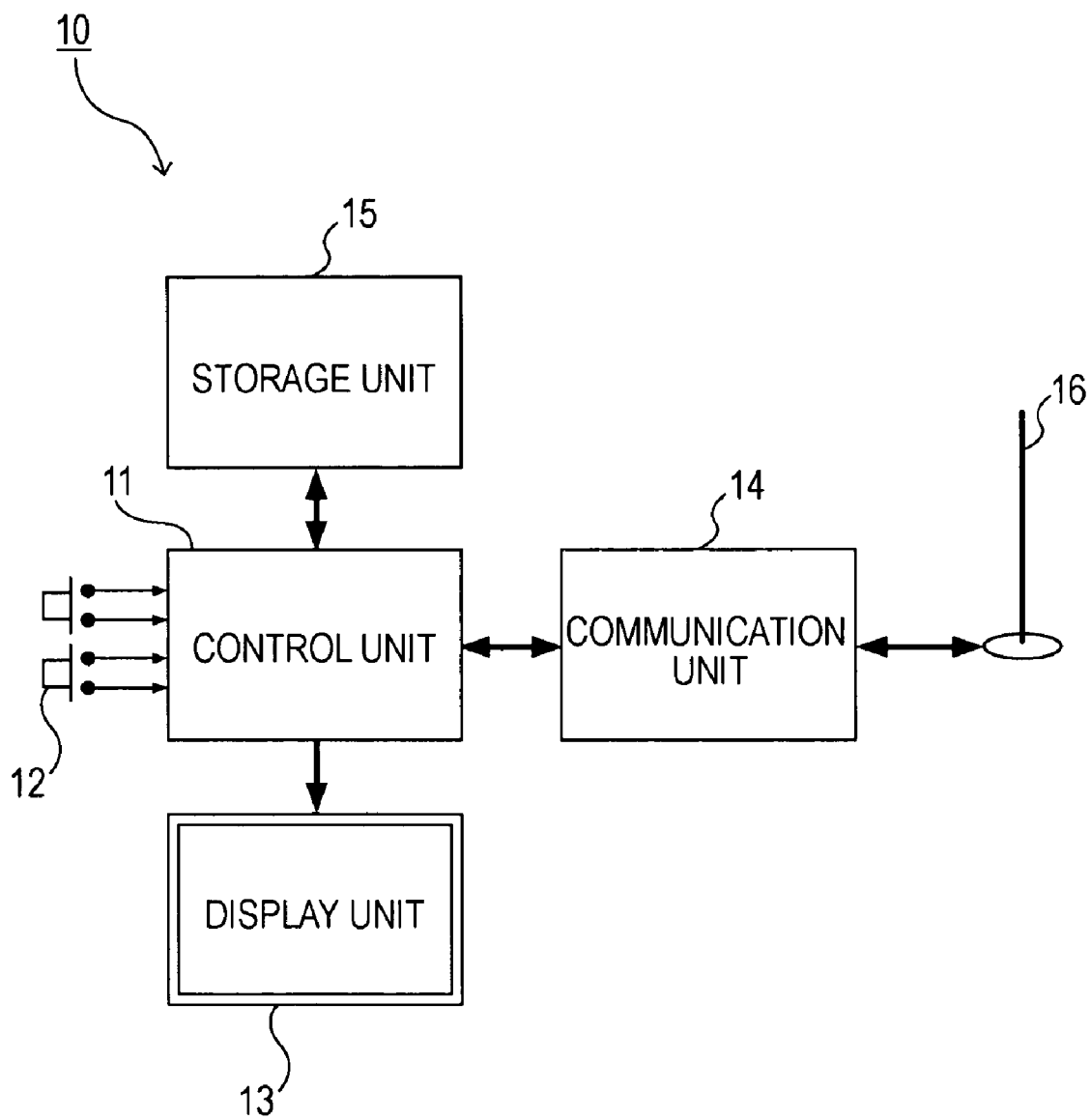
FIG. 2 is a block diagram illustrating an internal configuration of a wireless UIM.

FIG. 2 is a block diagram illustrating an internal configuration of the wireless UIM 10. The wireless UIM 10 includes a control unit 11, operation buttons 12, a display unit 13, a communication unit 14, and storage unit 15.

The operation buttons 12 allows the user to perform various setting operations for the wireless UIM 10. The display unit 13 is an output device for displaying notifications and settings to the user. The communication unit 14 performs wireless signal transmission/reception to and from the IP telephony terminals via an antenna 16. The storage unit 15 is a non-rewritable storage device such as, for example, a smartcard IC (Integrated Circuit) conforming to ISO7816. The storage unit 15 stores information used for the authentication of the user (i.e., the authentication information).

The wireless UIM 10 having the above-described configuration is implemented in an easy-to-carry form for the user. For example, the wireless UIM 10 may be embedded in user's mobile phone or employee ID (Identification) card.

Figure 3:
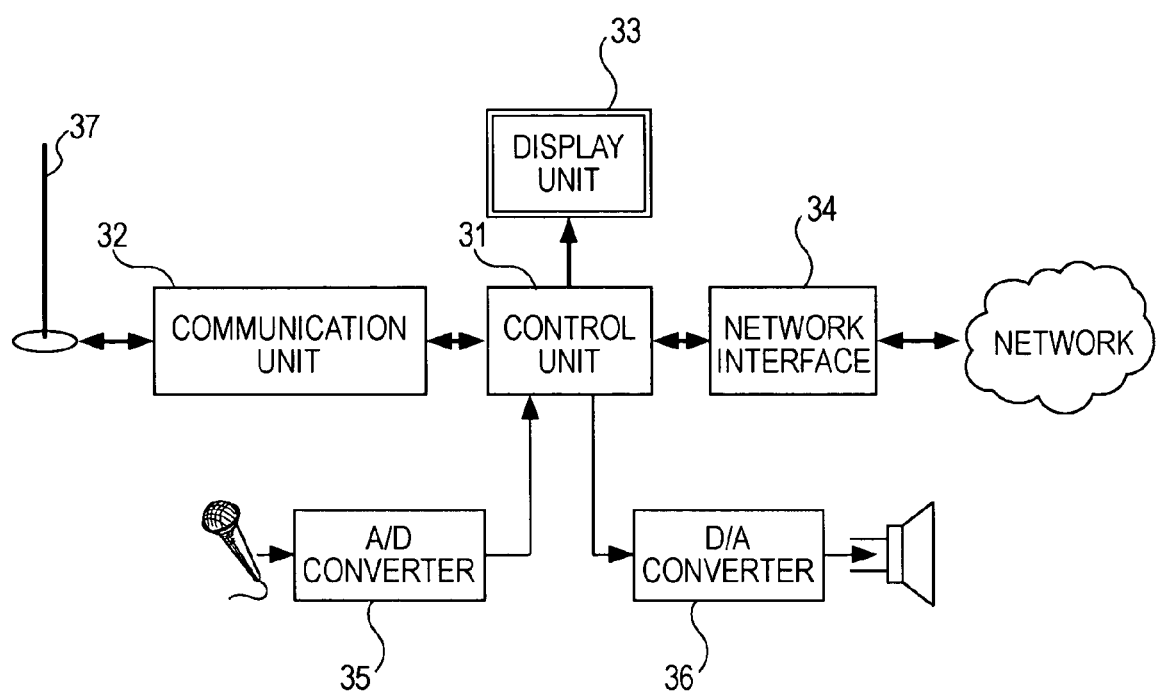
FIG. 3 is a block diagram illustrating a major configuration of an IP telephony terminal.

FIG. 3 is a block diagram illustrating a major configuration of the IP telephony terminal. The block diagram of FIG. 3 illustrates only the configuration used for the authentication between the IP telephony terminal and the above-described wireless UIM 10. More specifically, the IP telephony terminal includes a control unit 31, a communication unit 32, a display unit 33, a network interface 34, an A/D (Analog-to-Digital) converter 35, and a D/A (Digital-to-Analog) converter 36.

The communication unit 32 performs wireless signal transmission/reception to and from the wireless UIM 10 via an antenna 37. The display unit 33 is an output device for displaying notifications and for providing services to the user. The network interface 34 controls signal input/output between a network and the control unit 31. The A/D converter 35 converts analog audio signals captured by a microphone into digital signals. The D/A converter 36 converts digital signals received via the network into analog audio signals before supplying the analog signals to a speaker.

The authentication area of such an IP telephony terminal corresponds to the coverage area of the antenna 37. If the user carrying the wireless UIM 10 enters the authentication area, the IP telephony terminal automatically performs the authentication. Completion of the authentication brings the IP telephony terminal into a state ready for providing services to the user. Thus, the user only has to approach the IP telephony terminal while carrying the wireless UIM 10 to utilize the IP telephony terminal without performing any troublesome operations such as input of a user ID and a password.

The IP telephony server 20 serves as the communication control apparatus. The IP telephony server 20 includes an information acquiring unit (not shown) and a selecting unit (not shown). The information acquiring unit acquires address and capability information of each IP telephony terminal and identification information of the wireless UIM 10 from the plurality of IP telephony terminals that have completed the authentication of the wireless UIM 10. The selecting unit selects an optimum IP telephony terminal capable of handling data addressed to the wireless UIM 10 on the basis of the acquired information. The IP telephony server 20 may also include a priority setting unit if necessary. The priority setting unit registers priority information in a database (hereinafter, abbreviated as "DB"). The IP telephony server 20 may use the priority information when selecting the IP telephony terminal if necessary. Programs executed in the IP telephony server 20 (i.e., the communication control apparatus) implements the information acquiring unit, selecting unit, and priority setting unit.

Figure 4:
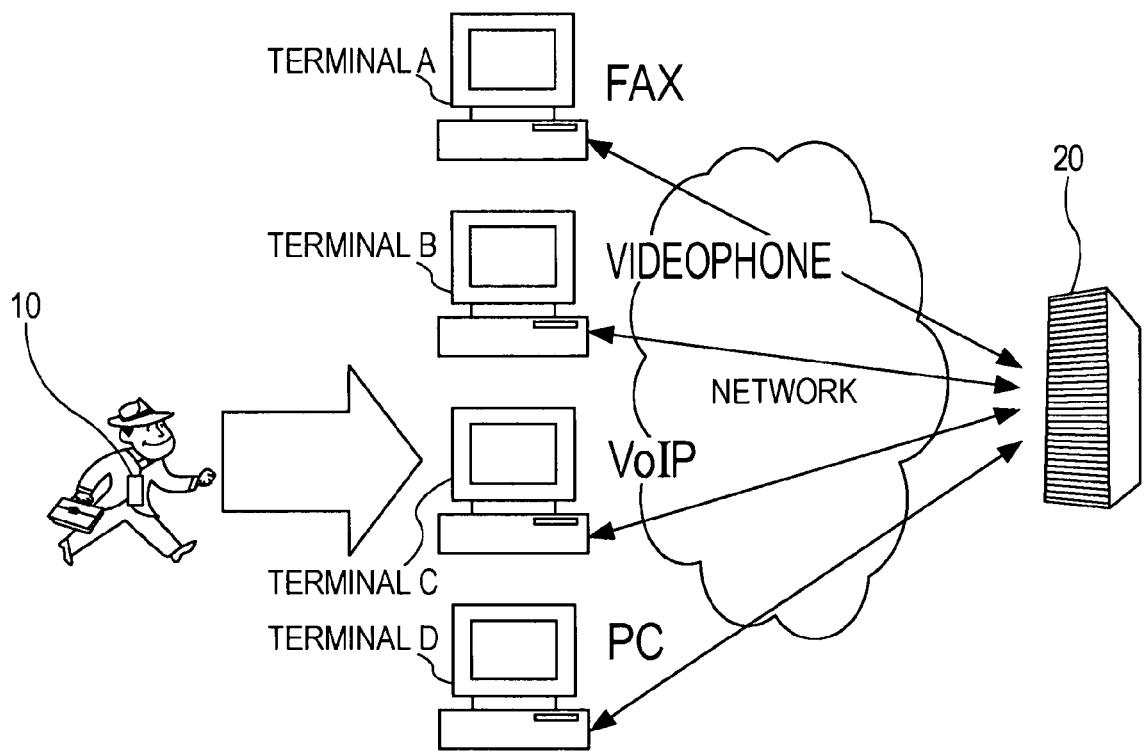
FIG. 4 is a schematic diagram illustrating detection of a wireless UIM.

In the IP telephony system applied to the embodiment of the present invention, the communication unit 14 of the wireless UIM 10 and the communication unit 32 of the IP telephony terminal have mechanisms to measure the distance therebetween using, for example, radio field intensity. The communication unit 32 of the IP telephony terminal determines that the user has approached when the distance becomes equal to or smaller than a predetermined value (See, FIG. 4).

Upon determining that the user (i.e., the wireless UIM 10) has approached, the wireless UIM 10 and the IP telephony server 20 perform authentication through the IP telephony terminal. The authentication is performed using an SSL (Secure Socket Layer) certificate stored in the storage unit 15 (e.g., the smartcard IC) of the wireless UIM 10.

Figure 5:
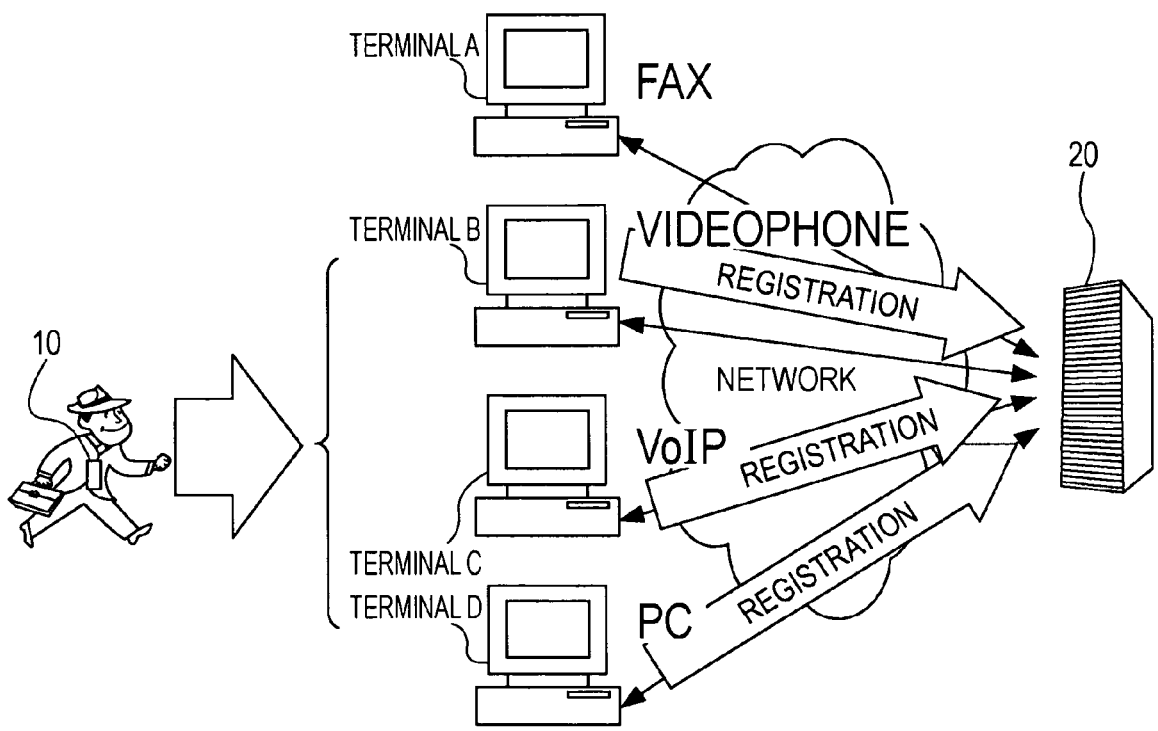
FIG. 5 is a schematic diagram illustrating registration of IP telephony terminals.

Then, the location and capability information of each terminal that has completed the authentication and the user ID of the wireless UIM 10 are sent to the IP telephony server 20 using SIP (Session Initiation Protocol) (See FIG. 5). In an example shown in FIG. 5, the authentication is completed between the three terminals B, C, and D and the wireless UIM 10 carried by the user. Thus, the location and capability information of the terminals B, C, and D and the user ID of the wireless UIM 10 are sent to the IP telephony server 20 from the terminals B, C, and D.

The information acquiring unit of the IP telephony server 20, in turn, registers the location information (e.g., an IP address and a port number) sent from the IP telephony terminals in a terminal location DB. In addition, the information acquiring unit of the IP telephony server 20 registers the capability information (e.g., capabilities of handling audio data, video data, text data, and data file communication) sent from the IP telephony terminals in a terminal capability DB. Furthermore, the priority setting unit of the IP telephony server 20 registers information about terminals that preferentially receive incoming calls (hereinafter, referred to as "preferential terminal") in a preferential terminal DB.

Figure 6:
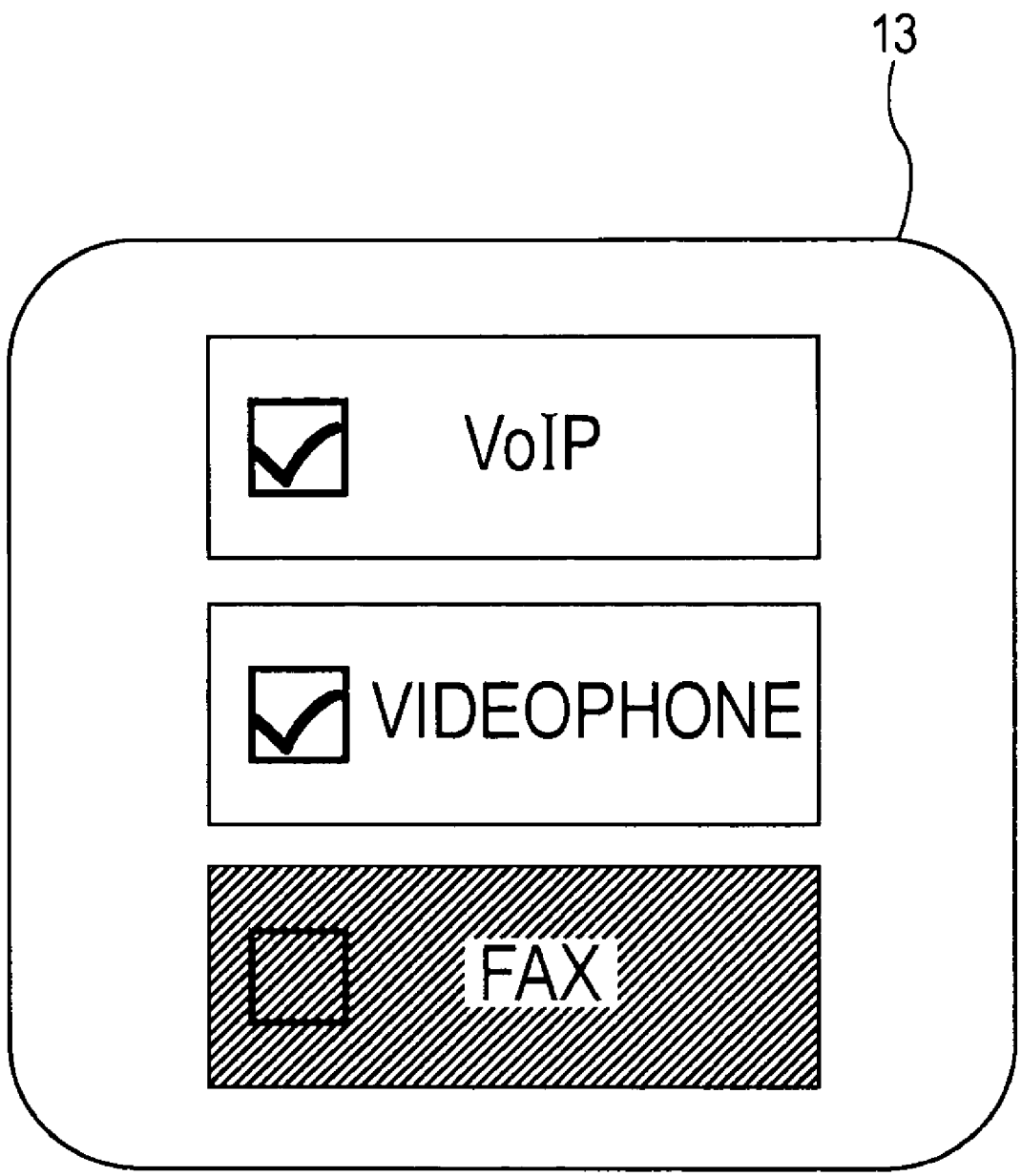
FIG. 6 is a schematic diagram showing an example screen of a wireless UIM.

Moreover, when registering such information, the user can optionally set permission, prohibition, or priority of some services in advance. More specifically, the user can set services such as a VOIP service, a videophone service, and a facsimile service with the display unit 13 and the operation buttons 12 of the wireless UIM 10 (See FIG. 2). Referring to FIG. 6, the services of VOIP, videophone, and facsimile are set as ON, ON, and OFF, respectively.

In an example shown in FIG. 6, the user checks check boxes of services (i.e., the VOIP and videophone services in the example) that the user desires (or permits) among the displayed services. This allows the user to receive only the desired services.

These user's settings are registered in a preferential media DB that stores information on the preferential media specified by each user. When making an IP phone call, the IP telephony terminal sends the IP telephony server 20 a call initiation request together with information on media to be utilized. Accordingly, each user can specify the media receivable by the preferential terminal using the preferential media DB.

A request processing unit (not shown) of the IP telephony server 20 receives the call initiation request. Then, a destination terminal selecting unit (i.e., the above-described selecting unit) acquires the information on the destination user from the terminal location DB, the terminal capability DB, the preferential terminal DB, and the preferential media DB. The destination terminal selecting unit selects the optimum destination terminal on the basis of the information acquired from these DBS. The request processing unit then sends the call initiation request to the selected terminal. Upon receiving the request, the selected terminal sends back a call initiation response, whereby the call is established between the terminals.

For example, suppose an IP videophone call is sent to the user shown in FIG. 5. The selecting unit selects the terminal B registered to be capable of handling the IP videophone call as the optimum terminal from the terminals B, C, and D registered in the terminal location DB on the basis of the information stored in the terminal capability DB. When a plurality of terminals capable of handling the videophone calls exist, the selecting unit selects the preferential terminal registered in the preferential terminal DB.

As described above, when the IP telephony call is sent to the user, the IP telephony server (i.e., communication control apparatus) selects the IP telephony terminal capable of handling the requested service (i.e., one of the IP telephony services) from those having authenticated the wireless UIM carried by the user. If a plurality of terminals capable of handling the requested service exist, the IP telephony server selects the optimum terminal on the basis of the priority set by the user in advance. Accordingly, the IP telephony server automatically selects the optimum IP telephony terminal for the user, thus allowing the user to receive the incoming call via the most easily-accessible terminal.

[Client-Driven Communication Control System]

In the above-described server-driven communication control system, a server selects a terminal capable of handling a service. However, this type of system may require a dedicated server. According to another embodiment of the present invention, an example case where coordination is performed among a plurality of IP telephony terminals to automatically direct an IP phone call to an optimum terminal located near a user is described below.

Figure 9:
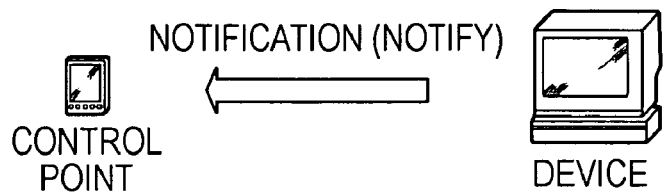
FIG. 9 is a schematic diagram illustrating detection of UPnP devices.
Figure 9:
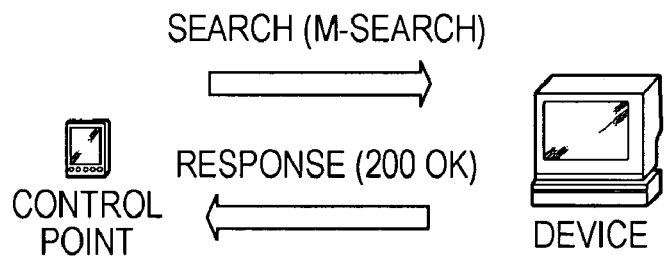
Figure 9:
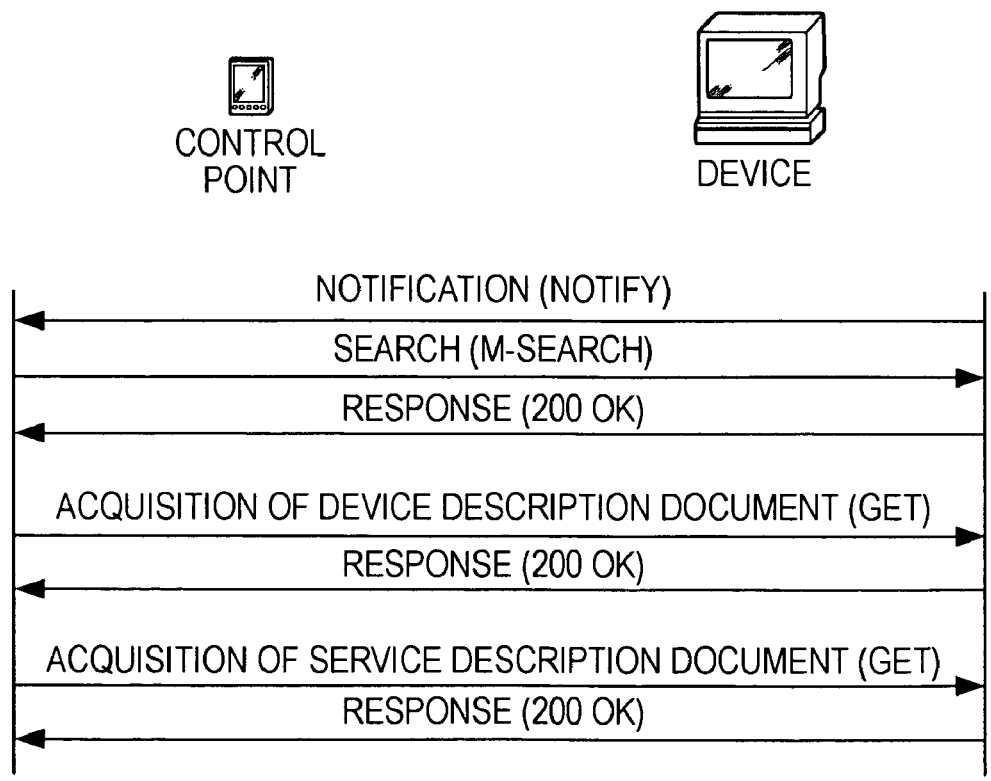

More specifically, the communication control system according to the embodiment utilizes a UPnP (Universal Plug and Play) function as shown in FIG. 9. In this communication control system, one of the IP telephony terminals is assigned as a control point and others as UPnP devices. The control point manages the information of other IP telephony terminals (i.e., the UPnP devices). That is, the terminal assigned as the control point serves as not only the IP telephony terminal but also a communication control apparatus.

Figure 7:
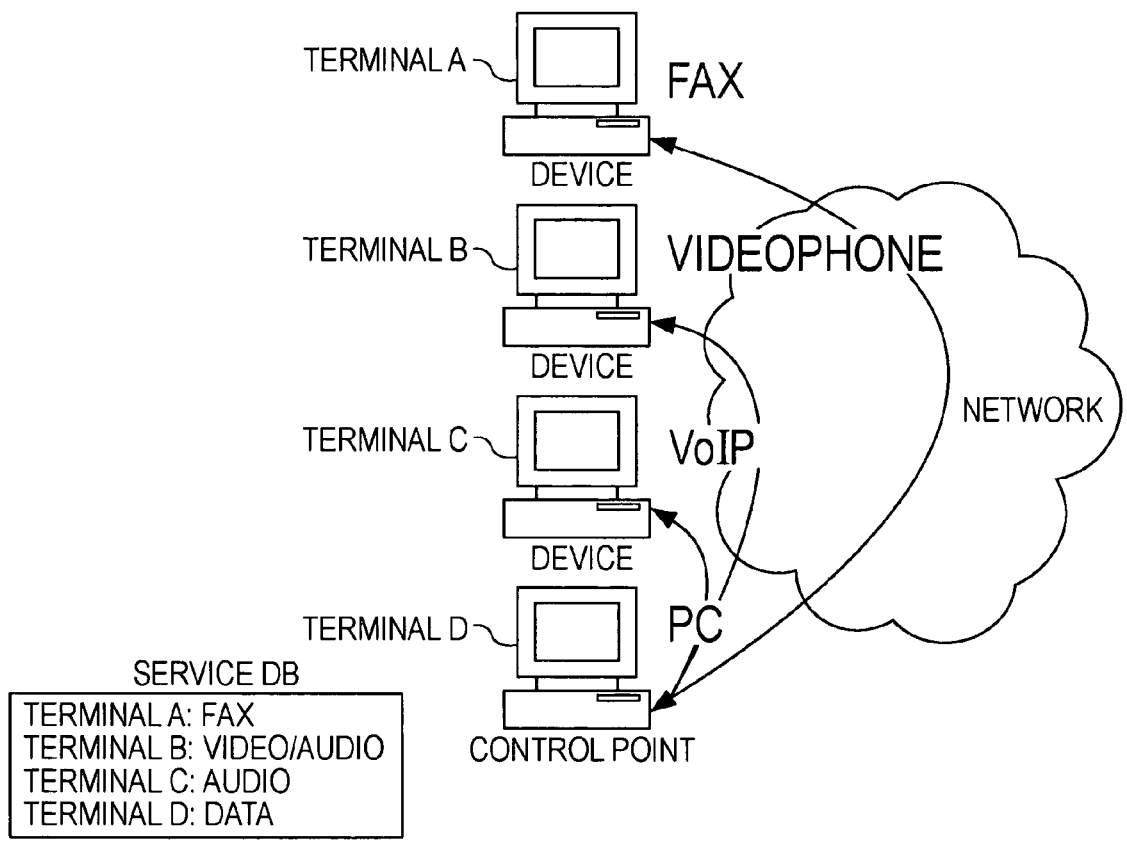
FIG. 7 is a schematic diagram illustrating acquisition of terminal information.

In the embodiment, as shown in FIG. 7 for example, one of the IP telephony terminals assigned as the control point beforehand (i.e., a terminal D) performs a discovery operation using a broadcast packet to detect other IP telephony terminals (i.e., terminals A, B, and C).

In addition, the control point uses a UPnP description function to acquire detailed information from the IP telephony terminals (i.e., the terminals A, B, and C) detected by the discovery operation. The detailed information includes information on kinds of service handlable by the terminals. The control point (i.e., the terminal D) registers the acquired information in a service DB included therein.

The control point (i.e., the terminal D) performs the discovery operation each time IP telephony terminals are newly connected to a network. This allows the control point (i.e., the terminal D) to acquire the information on all of the IP telephony terminals connected to the network.

A communication unit 14 of the wireless UIM 10 and a communication unit 32 of the IP telephony terminal have mechanisms to measure the distance therebetween using, for example, radio field intensity. The communication unit 32 of the IP telephony terminal determines that the user has approached when the distance becomes equal to or smaller than a predetermined value. After detecting the user's approach, the IP telephony terminal (e.g., the terminal A, B, or C in the example shown in FIG. 8) notifies the control point (e.g., the terminal D in the example shown in FIG. 8) of the user's approach via the UPnP network. At this time, the IP telephony terminal (e.g., the terminal A, B, or C) may notify the control point of the permission, prohibition, or priority of some services set by the user beforehand with the wireless UIM 10 (See FIG. 6). More specifically, the user can select desired services from those displayed on the display unit 13 by checking check boxes of the desired services (in the example shown in FIG. 6, the VOIP and videophone services).

Figure 8:
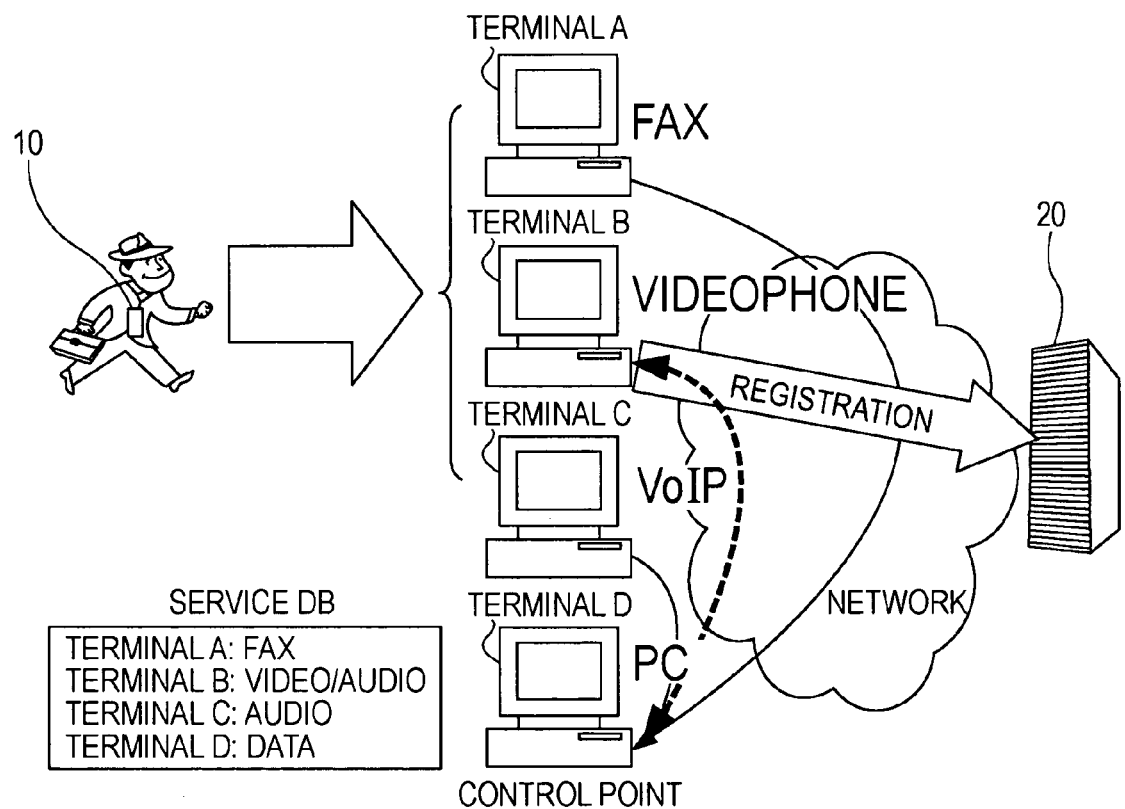
FIG. 8 is a schematic diagram illustrating selection of an optimum IP telephony terminal.

The control point (i.e., the terminal D) selects the optimum IP telephony terminal from those (i.e., the terminals A, B, and C) having detected the user's approach, and sends a notification of the selection via the UPnP network. FIG. 8 illustrates a case where a videophone call is being sent to a user through an IP telephony server 20. The IP telephony terminals A, B, and C are registered in the above-mentioned service DB as those capable of handling the facsimile service, the video-phone service, and the VOIP service, respectively. The control point (i.e., the terminal D) selects the terminal B capable of handling the videophone call on the basis of the information registered in the service DB.

Authentication is then performed between the wireless UIM 10 and the IP telephony server 20 through the IP telephony terminal B. The authentication may be performed with all of the IP telephony terminals (i.e., the terminals A, B, and C) that have detected the approach of the wireless UIM 10 before the control point selects the optimum terminal. The authentication is performed using an SSL certificate stored in the storage unit 15 such as a smartcard IC (See FIG. 2) of the wireless UIM 10.

Then, the location and capability information of the terminal B and user ID of the wireless UIM 10 are sent to the IP telephony server using SIP (Session Initiation Protocol). This enables the incoming call addressed to the wireless UIM 10 having the registered user ID to be receivable via the terminal B.

As described above, one of the IP telephony terminals is assigned as the control point (i.e., the communication control apparatus). The control point terminal acquires the information regarding other terminals and selects the optimum terminal for providing the service to the user. Thus, a system capable of selecting the optimum terminal for the user can be built easily without providing another server.

[Notification of Available Terminals]

Even if there are available IP telephony terminals near a user, the user has difficulty knowing the application installed therein from their appearance. For example, when the user desires to use the IP telephony terminal having application for videophone service, the user has difficulty discerning such a terminal from its appearance. This undesirably prevents the user from rapidly recognizing services currently providable by nearby IP telephony terminals.

A function described below is used to overcome this disadvantage. More specifically, after having completed the authentication of a wireless UIM 10 carried by the user and being registered in an IP telephony server, the IP telephony terminals know what services are made available. Thus, the IP telephony terminals notify the wireless UIM 10 of the available services. The wireless UIM 10, in turn, displays the currently available services on a display unit 13 as shown in FIG. 6, thereby informing the user of the available services. In an example shown in FIG. 6, the user can know that the services displayed in white (i.e., VOIP and videophone services) are available, while the service displayed in gray (i.e., a facsimile service) is unavailable.

In some cases, the user has difficulty determining currently available terminals. For example, the user has difficulty determining which IP telephony terminals from those located in front of the user are capable of providing an IP phone call service. To overcome this disadvantage, the available terminals that have authenticated the wireless UIM 10 are configured to indicate that they are available.

In this case, in response to a request transmitted from the wireless UIM 10, a selecting unit of a communication control apparatus (e.g., an IP telephony server or an IP telephony terminal assigned as a control point) automatically selects a terminal capable of handling the request, and notifies the user of the selection. If a plurality of terminals capable of handling the request exist, the selecting unit selects one terminal on the basis of priority set by a priority setting unit.

The user may be notified of the selected terminal by, for example, a blinking light disposed on the selected terminal, a message displayed on a display unit, or a sound. This allows the user to appropriately recognize which terminal to use.

Alternatively, the selected terminal may be configured to transmit the information of the available terminals to the wireless UIM 10 carried by the user. The wireless UIM may be configured to inform the user of the available terminals. This also allows the user to appropriately recognize which terminal to use.

[Service Request from Users] In the above-described communication control systems (i.e., the server-driven type and the client-driven type), when a user requests services, the user first sets the desired services using operation buttons 12 of a wireless UIM 10. As shown in FIG. 6, the user performs this setting operation by checking the check boxes of the desired services displayed on a display unit 13 with the operation buttons 12.

If the user carrying the wireless UIM 10 enters an authentication area of an IP telephony terminal, authentication is performed wirelessly between the IP telephony terminal having detected the wireless UIM 10 and the wireless UIM 10. The authentication is performed using an SSL (Secure Socket Layer) certificate stored in a storage unit 15, such as a smartcard IC, of the wireless UIM 10. Then, the IP telephony terminals that have completed the authentication send the location and capability information of each terminal to a communication control apparatus. An information acquiring unit of the communication control apparatus then registers the information in corresponding DBs. The communication control apparatus corresponds to the IP telephony server 20 in the server-driven communication control system and the control point in the client-driven communication control system.

The IP telephony server 20 in the server-driven system or the control point in the client-driven system then acquires the authentication information and the information on the desired services (i.e., the checked services) from the wireless UIM 10. The selecting unit of the IP telephony server 20 or the control point automatically selects the terminal capable of handling the service that the user desires.

The automatic selection of the terminal capable of handling the service that the user desires is made on the basis of the information having been registered in the DBs beforehand. If a plurality of terminals capable of handling the service exist, the terminal closest to the user or that having the highest priority may be selected.

For example, suppose the user has set a videophone service as the desired service with the wireless UIM 10. The selecting unit automatically selects the terminal capable of handling the videophone service and closest to the user from those located near the user and having completed the authentication.

After selecting the optimum terminal, the communication control apparatus notifies the user of the selected terminal in a manner described in [Notification of Available Terminals]. According to the notification, the user goes to a location where the selected terminal is located. When the user arrives at the location, the authentication has been completed via the wireless UIM 10. Thus, the user can immediately utilize the desired service.

That is, the user only has to set the desired services in their wireless UIM 10 so as to know the optimum terminal capable of handling the service. Upon arriving at the location where the terminal is located, the user can immediately utilize the service without performing an authentication operation such as input of a user ID and a password.

The communication control systems according to the embodiments of the present invention eliminate the necessity for changing terminals in accordance with the kinds of service. In addition, the communication control systems allow the user to rapidly recognize currently available services and available terminals from a plurality of terminals. Accordingly, the users are free from being conscious of the terminal available to the user, thus implementing a stress-free ubiquitous network.

It should be understood by those skilled in the art that various modifications, combinations, sub-combinations and alterations may occur depending on design requirements and other factors insofar as they are within the scope of the appended claims or the equivalents thereof.

What is claimed is:

1. A communication control apparatus that selects an optimum terminal for use by a user carrying a portable authentication device among a plurality of terminals that have completed authentication of the authentication device via wireless communication, the communication control apparatus comprising:

a receiver for receiving from said plurality of terminals address information and capability information of each of the plurality of terminals and for receiving identification information of the authentication device wirelessly transmitted from each of the plurality of terminals;

a selecting unit for selecting the optimum terminal having the capability of handling data addressed to the user carrying the authentication device among the plurality of terminals on the basis of the received capability information of the plurality of terminals and the received identification information of the authentication device, when the address information and capability information of the plurality of terminals are received by the communication control apparatus; and a transmitting unit configured to transmit selection information to said selected terminal and to the authentication device.

2. The apparatus according to claim 1, further comprising:

a priority setting unit for setting an order of priority among the plurality of terminals, wherein the selecting unit selects, when there are a plurality of terminals having the capability of handling the data addressed to the user carrying the authentication device, the optimum terminal among the plurality of terminals according to the order of priority set by the priority setting unit.

3. The apparatus according to claim 1, further comprising:

a notifying unit for notifying the user carrying the authentication device of the optimum terminal selected by the selecting unit.

4. A communication control apparatus that selects an optimum terminal for use by a user carrying a portable authentication device among a plurality of terminals that have completed authentication of the authentication device via wireless communication, the communication control apparatus comprising:

a receiver for receiving from said plurality of terminals address information and capability information of each of the plurality of terminals and identification information, the and for receiving processing request information of the authentication device wirelessly transmitted from each of the plurality of terminals;

a selecting unit for selecting the optimum terminal having the identification information of the authentication device received by the receiver and the capability of satisfying a processing request corresponding to the processing request information when the address information and capability information of the plurality of terminals are received by the communication control apparatus; and a transmitter for transmitting selection information to said selected terminal and to the authentication device.

5. The apparatus according to claim 4, further comprising:

a priority setting unit for setting an order of priority among the plurality of terminals, wherein the selecting unit selects, when there are a plurality of terminals having the identification information of the authentication device and the capability of satisfying the processing request, the optimum terminal among the plurality of terminals according to the order of priority set by the priority setting unit.

6. The apparatus according to claim 4, further comprising:

a notifying unit for notifying the user carrying the authentication device of the optimum terminal selected by the selecting unit.

7. A communication control system comprising:

a plurality of terminals that perform authentication of an authentication device carried by a user via wireless communication; and a communication control apparatus, connected to the plurality of terminals, having an information acquiring unit for acquiring, when there are a plurality of terminals that have completed authentication of the authentication device, address information and capability information of each of the plurality of terminals and identification information of the authentication device from each of the plurality of terminals, and a selecting unit for selecting the optimum terminal having the capability of handling data addressed to the user carrying the authentication device among the plurality of terminals on the basis of the capability information of the plurality of terminals and the identification information of the authentication device acquired by the information acquiring unit, when the address information and capability information of the plurality of terminals are acquired by the information acquiring unit.

8. The system according to claim 7, wherein the communication control apparatus further includes a priority setting unit for setting an order of priority among the plurality of terminals, wherein the selecting unit selects, when there are a plurality of terminals having the capability of handling the data addressed to the user carrying the authentication device, the optimum terminal among the plurality of terminals according to the order of priority set by the priority setting unit.

9. The system according to claim 7, wherein each of the plurality of terminals has output means that displays an indication when the terminal is selected as the optimum terminal by the selecting unit of the communication control apparatus.

10. The system according to claim 7, wherein the communication control apparatus further includes a notifying unit for notifying the authentication device carried by the user of the optimum terminal selected by the selecting unit.

11. The system according to claim 7, wherein the communication control apparatus is embedded in one of the plurality of terminals.

12. A communication control system comprising:

a plurality of terminals that perform authentication of an authentication device carried by a user via wireless communication; and a communication control apparatus, connected to the plurality of terminals, having an information acquiring unit for acquiring, when there are a plurality of terminals that have completed authentication of the authentication device, address information and capability information of each of the plurality of terminals, and identification information and processing request information of the authentication device from each of the plurality of terminals, and a selecting unit for selecting the optimum terminal having the identification information of the authentication device acquired by the information acquiring unit and the capability of satisfying a processing request corresponding to the processing request information when the address information and capability information of the plurality of terminals are acquired by the information acquiring unit.

13. The system according to claim 12, wherein the communication control apparatus further includes a priority setting unit for setting an order of priority among the plurality of terminals, wherein the selecting unit selects, when there are a plurality of terminals having the identification information of the authentication device and the capability of satisfying the processing request, the optimum terminal among the plurality of terminals according to the order of priority set by the priority setting unit.

14. The system according to claim 12, wherein each of the plurality of terminals has output means that displays an indication when the terminal is selected as the optimum terminal by the selecting unit of the communication control apparatus.

15. The system according to claim 12, wherein the communication control apparatus further includes a notifying unit for notifying the authentication device carried by the user of the optimum terminal selected by the selecting unit.

16. The system according to claim 12, wherein the communication control apparatus is embedded in one of the plurality of terminals.

17. A communication control system comprising:

a plurality of terminals that perform authentication of an authentication device carried by a user via wireless communication; and a communication control apparatus, connected to the plurality of terminals, having an information acquiring unit for acquiring, when there are a plurality of terminals that have completed authentication of the authentication device, address information and capability information of each of the plurality of terminals and identification information of the authentication device from each of the plurality of terminals, and a selecting unit for selecting the optimum terminal having the capability of handling data addressed to the authentication device among the plurality of terminals on the basis of the capability information of the plurality of terminals and the identification information of the authentication device acquired by the information acquiring unit, when the address information and capability information of the plurality of terminals are acquired by the information acquiring unit.

18. A communication control system comprising:

a plurality of terminals that perform authentication of an authentication device carried by a user via wireless communication; and a communication control apparatus, connected to the plurality of terminals, having an information acquiring unit for acquiring, when there are a plurality of terminals that have completed authentication of the authentication device, address information and capability information of each of the plurality of terminals and identification information and processing request information of the authentication device from each of the plurality of terminals, and a selecting unit for selecting the optimum terminal having the identification information of the authentication device acquired by the information acquiring unit and the capability of satisfying a processing request corresponding to the processing request information when the address information and capability information of the plurality of terminals are acquired by the information acquiring unit.

* * * * *